United States Patent [19]

Meyer et al.

[11] Patent Number: 5,724,174
[45] Date of Patent: Mar. 3, 1998

[54] INTERSUBBAND ELECTRO-OPTICAL MODULATORS BASED ON INTERVALLEY TRANSFER IN ASYMMETRIC DOUBLE QUANTUM WELLS

[75] Inventors: Jerry R. Meyer, Catonsville; Craig A. Hoffman, Columbia; Filbert Bartoli, Upper Malboro, all of Md.

[73] Assignee: The United States of America as represented by the Secretary of the Navy, Washington, D.C.

[21] Appl. No.: 586,476

[22] Filed: Jan. 11, 1996

[51] Int. Cl.$^6$ .................................................. G02F 1/03
[52] U.S. Cl. .................................................. 359/248
[58] Field of Search .................................................. 359/248

[56] References Cited

U.S. PATENT DOCUMENTS

| | | | |
|---|---|---|---|
| 5,225,692 | 7/1993 | Takeuchi et al. | 257/17 |
| 5,521,398 | 5/1996 | Pelekanos et al. | 257/17 |

OTHER PUBLICATIONS

Xie et al., "Infrared electroabsorption modulation at normal incidence in asymmetrically stepped AlSb/InAs/Ga/Sb/AlSb quantum wells". J. Applied Physics 76 (1) 92–96 (Jul. 1, 1994).

Xie et al., "Enchancement of intersubband Stark effects in L–valley step quantum wells for infrared modulcation and voltage tunable detection". J. Applied Physics 74 (2) 1195–98 (Jul. 15, 1993).

Xie et al., "Normal incidence infrared modulator using direct–indirect transitions in GaSb quantum wells". Applied Physics Letters 63 (6) 776–78 (Aug. 9, 1993).

Meyer et al., "Infrared electro–optical modulators based on field–induced Gamma–L intervalley transfer". Applied Physics Letters 67 (19) 2756–58 (Nov. 6, 1995).

Primary Examiner—David C. Nelms
Assistant Examiner—Thomas Robbins
Attorney, Agent, or Firm—Thomas E. McDonnell; John J. Karasek

[57] ABSTRACT

The present invention is an electro-optical modulator having (a) a first semiconductor layer and a second semiconductor layer; (b) a first quantum well layer having a conduction band minimum at an optically active point (typically the L point or the X point), disposed between the first and second semiconductor layers; (c) a second quantum well layer having a conduction band minimum at the optically inactive (at normal incidence) Γ point, disposed between the first and second semiconductor layers; (d) a spacer layer disposed between the first and second quantum well layers, where the spacer layer has a conduction band minimum that is large enough for establishing quantum confinement in the first quantum well layer at the optically active point and in the second quantum well layer at the Γ point, but small enough to allow tunnelling between the two layers on a time scale consistent with the desired switching response time. The invention also has some controllable means for applying an electric field. The invention can produce both intensity and phase changes, and may be used in a Fabry-Perot device to achieve greater modulation for a given active region thickness.

25 Claims, 6 Drawing Sheets

INTERSUBBAND ELECTRO-OPTICAL MODULATORS BASED ON INTERVALLEY TRANSFER IN ASYMMETRIC DOUBLE QUANTUM WELLS

BACKGROUND OF THE INVENTION

1. Field of the Invention

The present invention relates to intersubband electro-optical intensity and phase modulators based on intervalley transfer in semiconductor asymmetric double quantum wells, and more particularly to field-switchable electro-optical intensity and phase modulators where the electron populations may be moved between two quantum wells having conduction band minima in different valleys, separated by a spacer layer.

2. Description of the Related Art

Semiconductor electro-optical modulators based on $\Gamma$-valley intersubband transitions are known in the art. These modulators have a number of shortcomings. One serious limitation is that these devices do not work for light at normal light incidence. Another shortcoming is that these devices will only shift the wavelength location of the resonance peak, rather than eliminating this absorption peak. Thus, these devices work as $\lambda_1$–$\lambda_2$ modulators that shift the $\lambda$ of the absorption, rather than off-on modulators.

Intersubband electro-optical intensity and phase modulators based on intervalley transfer in a stepped quantum well are known. Referring to FIG. 1, in an asymmetrically stepped quantum well electro-optical modulator 10, a first well step layer 14 and a second well step layer 16 are disposed between two semiconductor barrier layers 12. The $\Gamma$ valley minimum is in the first well step layer 14, while the $\Gamma$ valley minimum is in the second well step layer 16. In this structure, the overall conduction band minimum is at the $\Gamma$ valley at zero applied field (or positive applied field, i.e., in the positive x-direction). Electrons in the $\Gamma$ valley do not absorb light readily at normal incidence, due to the high degree of symmetry of these isotropic states. This selection rule occurs because an optical-electric field in the plane does not perturb the states quantized along the growth axis.

However, as shown in FIG. 2, the conduction band minimum shifts to the L valleys under a moderate negative electric field. Consequently, electrons will tend to shift to the L valleys under a sufficiently high negative electric field. Since these electrons will absorb normally incident light (due to the anisotropy of these states an in-plane optical-electric field couples to intersubband optical transitions as long as the growth axis does not coincide with the symmetry axes of all the ellipses), applying a sufficiently high negative electric field will cause this structure to couple with normally incident light.

The absorption of light in this structure is governed by the energy band gap between the first conduction subband minimum at the L point (L1) and the second conduction subband minimum at the L point (L2). This energy is approximated by $$E = \frac{\hbar^2 \pi^2 j^2}{m_2 d_w^2}$$

where j is the subband index, $m_2$ is L valley quantization mass, and $d_w$ is the width (thickness) of the layer 16. Accordingly, for shorter $\lambda$, higher energy light, a relatively thin second step layer 16 will typically be used. This structure has an undesirably low sensitivity (the relative shift with field of the $\Gamma$ and L layers is on the order of 0.005 meV·cm/kV), and thus is unattractive for most applications (i.e., unreasonably high electric fields are required to produce a useful modulation magnitude).

SUMMARY OF THE INVENTION

Accordingly, it is an object of this invention to improve the sensitivity of normal incidence intensity and phase electro-optical modulators.

It is a further object of the invention to make this improved sensitivity available in both the long wave infrared LWIR (approximately 6–20 µm, more typically 8–14 µm) and mid-wave infrared MWIR (approximately 1.5–6 µm, more typically 3–5 µm) bands.

These and additional objects of the invention are accomplished by the structures and processes hereinafter described.

The present invention is an electro-optical modulator having (a) a first semiconductor barrier layer and a second semiconductor barrier layer; (b) a first quantum well layer having a conduction band minimum at an optically active point (typically the L point or the X point), disposed between the first and second semiconductor layers; (c) a second quantum well layer having a conduction band minimum at the $\Gamma$ point, disposed between the first and second semiconductor layers; (d) a spacer layer disposed between the first and second quantum well layers, where the spacer layer has a conduction band minimum that is large enough for establishing quantum confinement in the first quantum well layer at the optically active point and in the second quantum well layer at the $\Gamma$ point, but small enough to allow tunnelling between the two layers on a time scale consistent with the desired switching response time. The invention also has some controllable means for applying an electric field parallel to the growth axis.

In another aspect, the present invention is an electro-optical modulator having (a) a first semiconductor barrier layer and a second semiconductor barrier layer; (b) a first quantum well layer having a conduction band minimum at an optically active at normal incidence point (typically the L point or the X point), disposed between the first and second semiconductor layers; (c) a second quantum well layer having a conduction band minimum at an optically inactive at normal incidence point (typically the $\Gamma$ point), disposed between the first and second semiconductor layers; (d) a spacer layer disposed between the first and second quantum well layers, where the spacer layer has a conduction band minimum that is large enough for establishing quantum confinement in the first quantum well layer at the optically active point and in the second quantum well layer at the optically inactive point, but small enough to allow tunnelling between the two layers on a time scale consistent with the desired switching response time. The invention also has some controllable means for applying an electric field parallel to the growth axis.

BRIEF DESCRIPTION OF THE DRAWINGS

A more complete appreciation of the invention will be obtained readily by reference to the following Description of the Preferred Embodiments and the accompanying drawings in which like numerals in different figures represent the same structures or elements, wherein.

DETAILED DESCRIPTION OF THE PREFERRED EMBODIMENTS

The following are incorporated herein by reference, in their entireties, and for all purposes:

(a) Xie et al., "Infrared electroabsorption modulation at normal incidence in asymmetrically stepped AlSb/InAs/GaSb/AlSb quantum wells", J. Applied Physics 76 (1) 92-96 (Jul. 1, 1994);

(b) Xie et al., "Enhancement of intersubband Stark effects in L-valley step quantum wells for infrared modulation and voltage tunable detection", J. Appl. Phys. 74 (2) 1195-98 (Jul. 15, 1993);

(c) Xie et al., "Normal incidence infrared modulator using direct-indirect transitions in GaSb quantum wells", Appl. Phys. Lett. 63 (6) 776-78 (Aug. 9, 1993);

(d) Meyer et al., "Infrared electro-optical modulators based on field-induced $\Gamma$-L intervalley transfer", Appl. Phys. Lett. 67 (19) 2756-58 (Nov. 6, 1995);

(e) Meyer et al., "Intersubband Transitions for Infrared Electro-Optics and Nonlinear Optics", in *Novel Optical Materials and Applications* (L. C. Khoo, F. Simoni, & C. Umeton, eds., forthcoming 1996).

Figure 2:
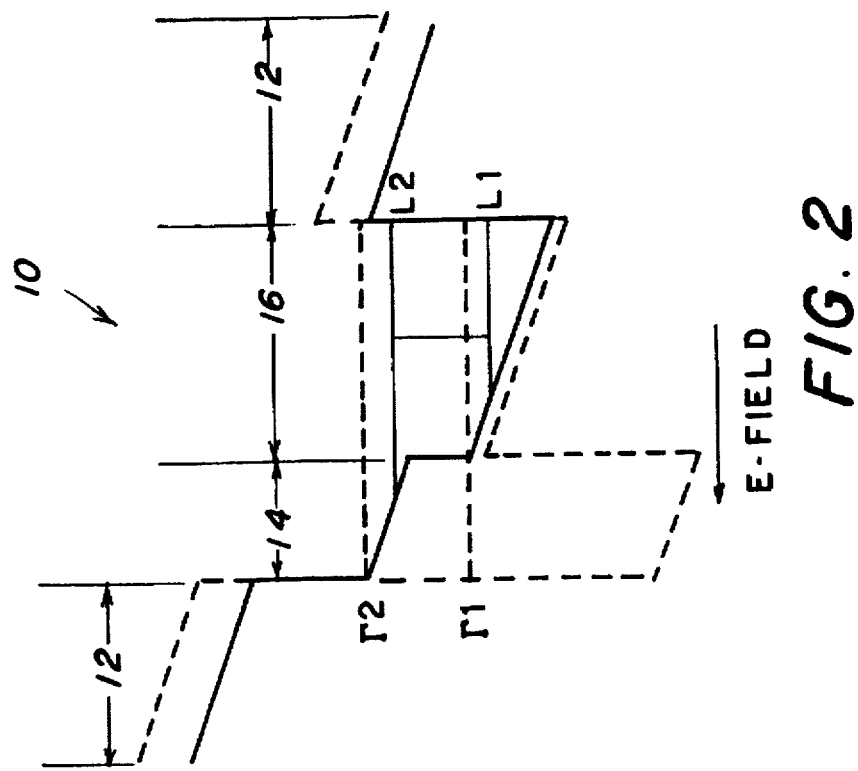
FIG. 2 (prior art) shows the modulator shown in FIG. 1 with an applied electric field.
Figure 1:
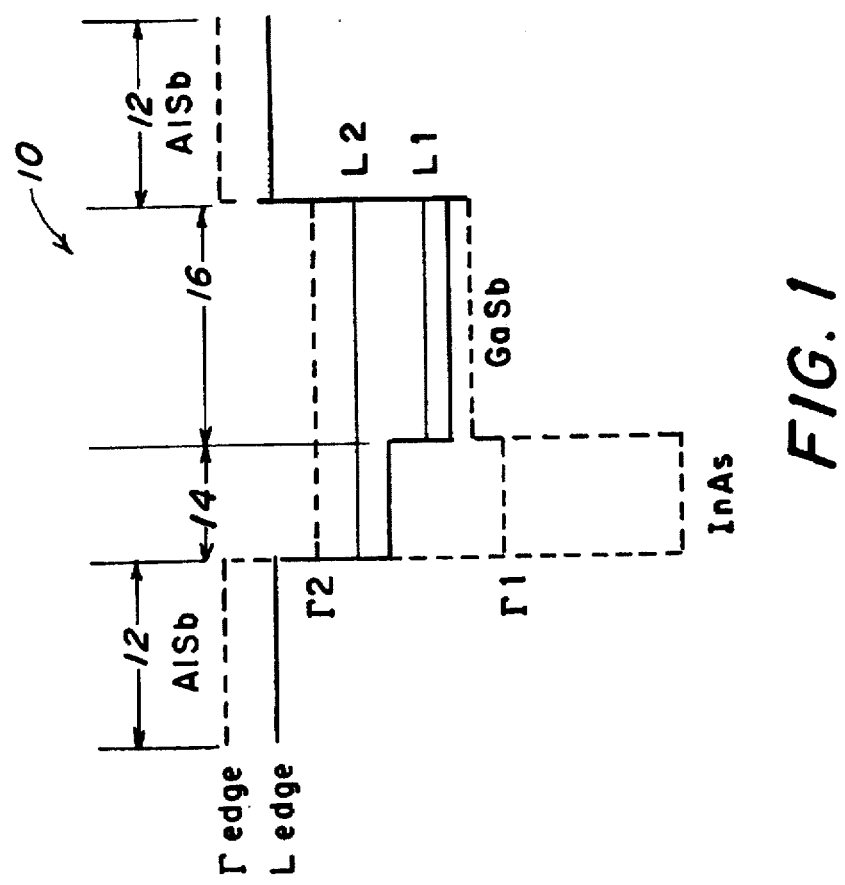
FIG. 1 (prior art) shows an asymmetrically stepped quantum well electro-optical modulator with no applied field.
Figure 3:
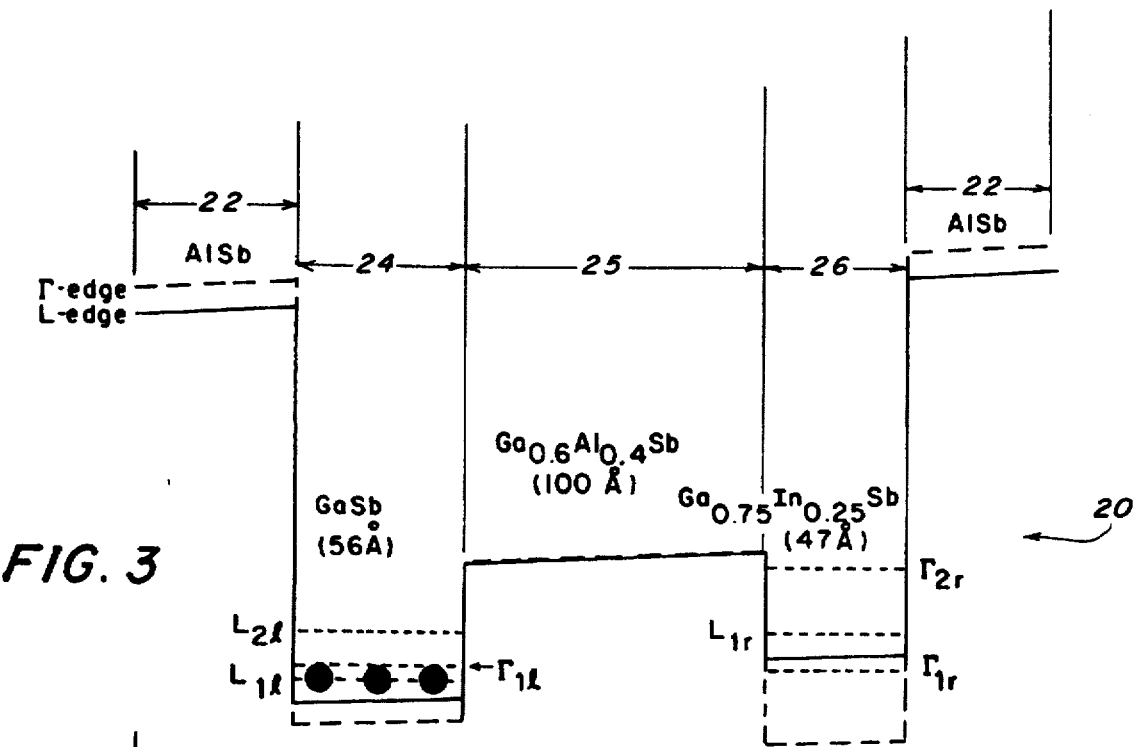
FIG. 3 shows an asymmetric double quantum well (ADQW) with a spacer between the two quantum wells in an applied positive electric field, according to the invention.

As shown in FIG. 3, the present electro-optical modulator 20 has a first quantum well 24 and a second quantum well 26 disposed between two semiconductor barrier layers 22 and separated by a spacer layer 25. The minimum in the first quantum well 24 is at the $\Gamma$ point of the Brillouin zone, while the minimum in the second quantum well 26 is at the F point of the Brillouin zone. In this structure, the conduction band minimum in the structure as a whole is at the L valley at positive applied field. Electrons in the L valley readily absorb light at normal incidence, due to the high degree of anisotropy of these states, as long as the optical-electric field does not lie along a symmetry axis of the effective mass ellipse.

Figure 4:
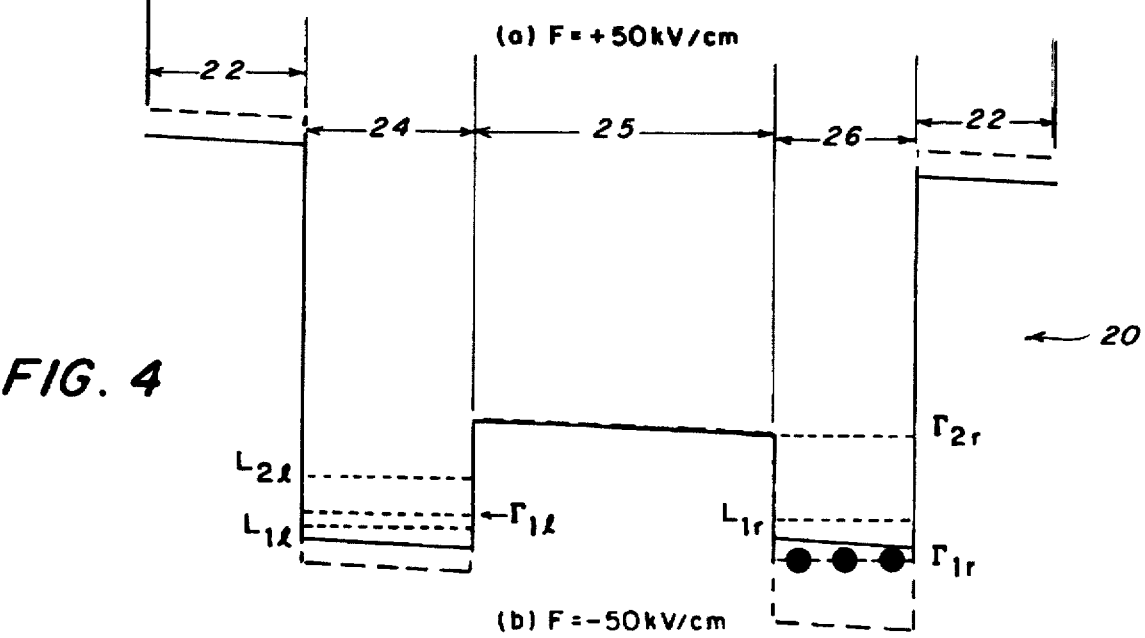
FIG. 4 shows an asymmetric double quantum well with a spacer between the two quantum wells in an applied negative electric field, according to the invention.

However, as shown in FIG. 4, the conduction band minimum shifts to the $\Gamma$ valleys under a negative electric field. Consequently, electrons will tend to shift to the $\Gamma$ valleys under a negative electric field. Since these electrons will not readily absorb normally incident light (due to the isotropy of these states), applying a negative electric field will cause this structure to not couple with normally incident light. The device may alternatively be designed such that most of the electrons will be in one valley (the L/X valley or the $\Gamma$ valley) at zero field, and then shift to the other valley when a positive or negative field is applied.

The materials and thicknesses of the first and second quantum wells are selected using much the same criteria as in the prior art. Suitable materials for the first quantum well having an L valley minimum include GaSb, GaAlSb, and GaAsSb. Each of these may be grown along any axis, but preferably along the <100> axis. Alternatively, the first quantum well has an X valley. Suitable materials include AlAs and AlGaAs grown along an axis other than <100> or equivalent, for which the optical-electric field is along a symmetry axis of the effective mass ellipse (e.g., the <110> axis). Suitable materials for the second quantum well having a $\Gamma$ valley minimum include GaInSb, InAs, GaAsSb, GaAs, and AlGaAs.

Figure 5:
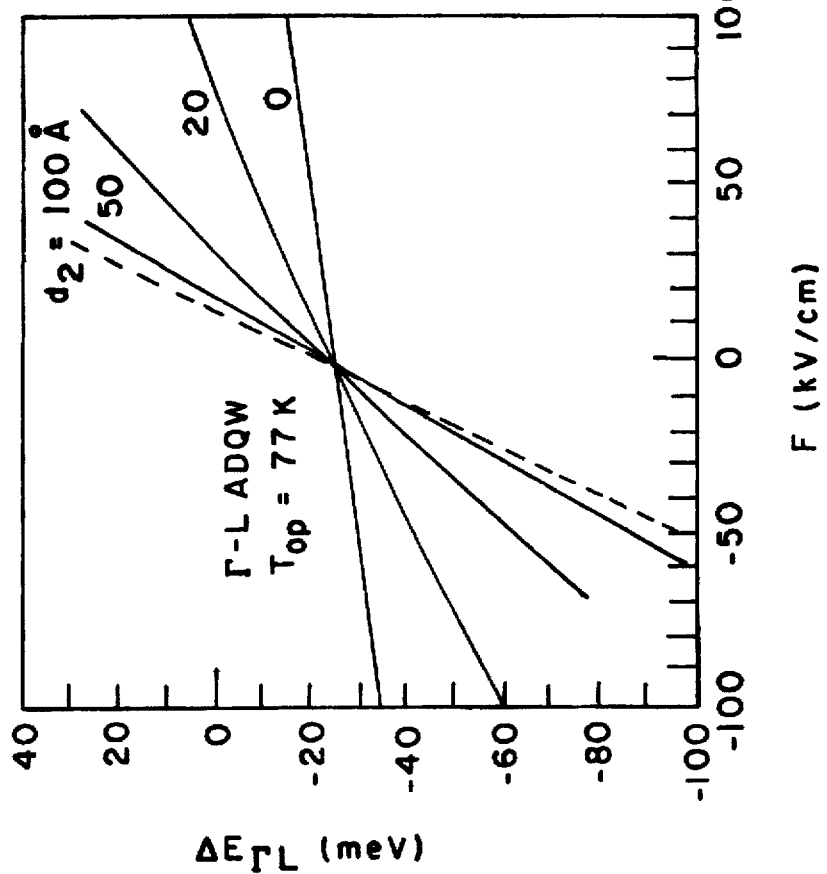
FIG. 5 shows, for various spacer layer thicknesses, the sensitivity of the energy level difference between the $\Gamma$ and L ground states to electric fields for the present invention.

The spacer layer should be selected to provide quantum confinement within each of the quantum wells, so that electron transfer between the wells is by tunnelling. The thickness of the spacer layer should be selected to give the desired sensitivity and tunnelling modulation time. Referring to FIG. 5, these data were modelled using a multi-band finite-element method (FEM) $\kappa\rho$ formalism (see L. R. Ram-Mohan and J. R. Meyer, J. Nonlinear Opt. Phys. Mater. 4 191 (1995). It is seen in FIG. 5 that the relative energy difference between the $\Gamma$ and L ground states vs. electric field depends upon the spacer layer thickness ($d_2$). The dashed curve is for $Ga_{0.75}In_{0.25}Sb$ $\Gamma$ valley wells, and the solid curves are for InAs $\Gamma$ valley wells (in both cases the L valley wells are GaSb). The change in energy difference between the two wells is roughly equal to the distance between the wells times the applied field. The principle correction to this approximation is the field created by the charge separation due to the shift of electrons from one well to the other, which is taken into account in FIG. 5. The $d_2=0$ curve (i.e., the sensitivity curve for a stepped well device without a spacer layer as described in the foregoing Related Art section) is shown for comparison. Note that this device has the lowest sensitivity (i.e., shift of the energy difference with field) of the devices shown.

Figure 6:
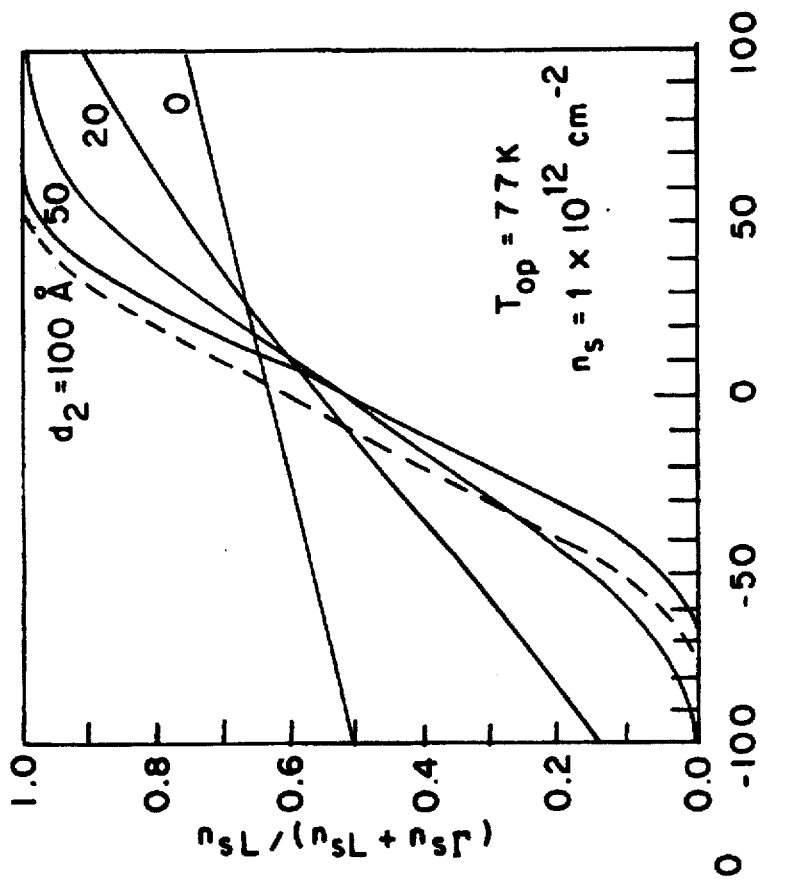
FIG. 6 shows, for various spacer layer thicknesses, the fraction of the electrons populating the L valleys in the device of the invention as a function of applied electric field.

Referring to FIG. 6, based on the same model as FIG. 5 and for the same devices as FIG. 5, it is seen that the fraction of electrons populating the L valley states vs. electric field likewise varies with $d_2$.

Figures 7, 8:
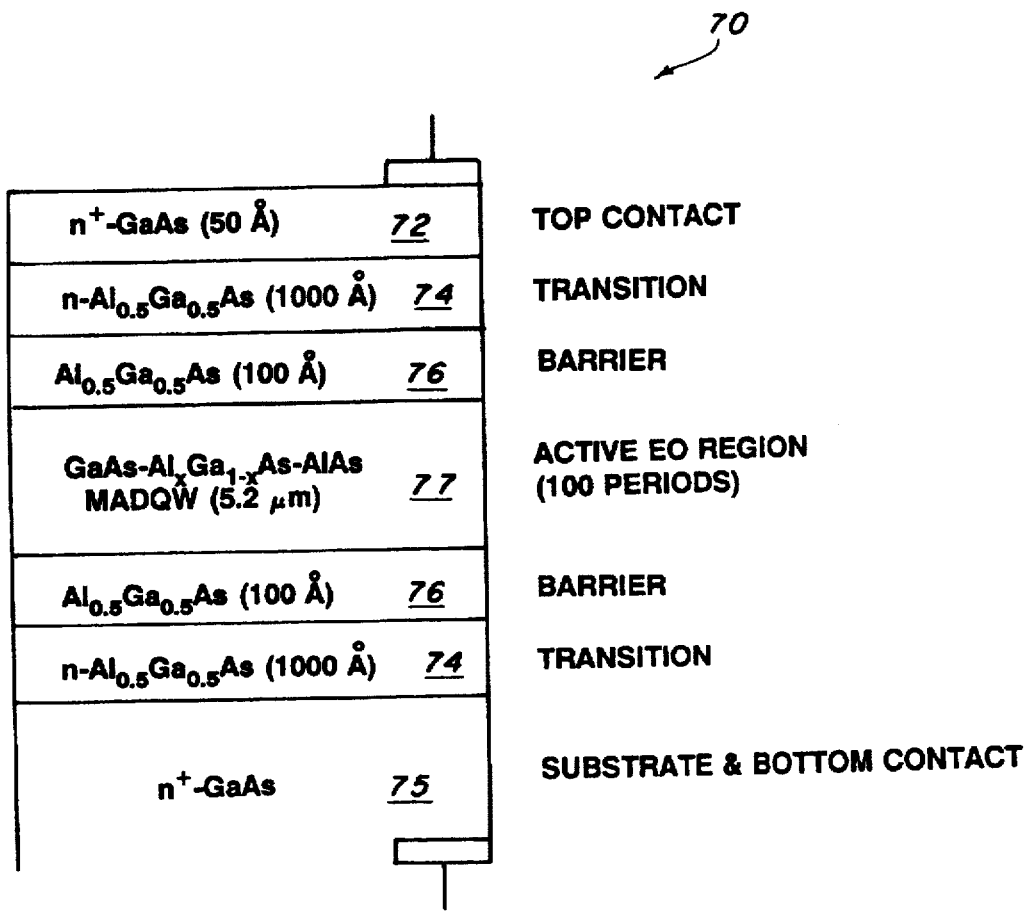
FIG. 7 shows a plurality (100) of asymmetric double quantum wells with spacers between the asymmetric quantum wells, with associated surrounding layers, according to the invention.
FIG. 8 shows a detail of one of the 100 asymmetric double quantum wells with spacers from FIG. 7.

Referring to FIG. 7, a typical device 70 according to the present invention will have a plurality 77 of asymmetric double quantum wells (e.g., 100 GaAs—$Al_xGa_{1-x}As$—AlAs active periods as shown in FIG. 7, where x may typically vary from 0.3 to 0.5, from 0.25 to 0.55, or from 0.2 to 0.7) sandwiched between a top contact layer 72 and a substrate and bottom contact layer 78, between two transition layers 74 (optional), and between two barrier layers 76 (optional). The barrier layers prevent leakage due to a net current flow through the device. The particular device shown in FIG. 7 is a preliminary electro-optical modulator designed for photoconductivity characterization. It should be noted that between 100 to 200 active periods will typically be preferred.

Referring to FIG. 8, a detail of one of the active regions 10 of the device shown in FIG. 7, shows two quantum wells (GaAs and n—AlAs ($1\times10^{12}$ $cm^{-2}$)) separated by a spacer layer ($Al_{0.35}Ga_{0.65}As$), with barrier ($Al_{0.5}Ga_{0.5}As$ and $Al_{0.35}Ga_{0.65}As$) layers to prevent leakage due to a net current flow from one period to the next in the device.

Antimony-based active regions also may be used. For example, an exemplary active region of 270 Å includes a 67 Å layer of AlSb, a 56 Å layer of GaSb, a 100 Å layer of $Ga_{0.5}Al_{0.5}Sb$, and a 47 Å layer of n-$Ga_{0.75}In_{0.25}Sb$. Such a device has a sheet doping density $N_s$, of $1-4\times 10^{12}$ $cm^{-2}$.

Any barrier, transition, and contact layers in this structure should be selected with growth concerns in mind. For example, the average lattice constants of the active layers should be close enough to that of the substrate to prevent excessive strain or dislocation defects. Additionally, as noted above, it is desired to include a barrier layer to ensure that inter-period leakage current is avoided.

Figure 9:
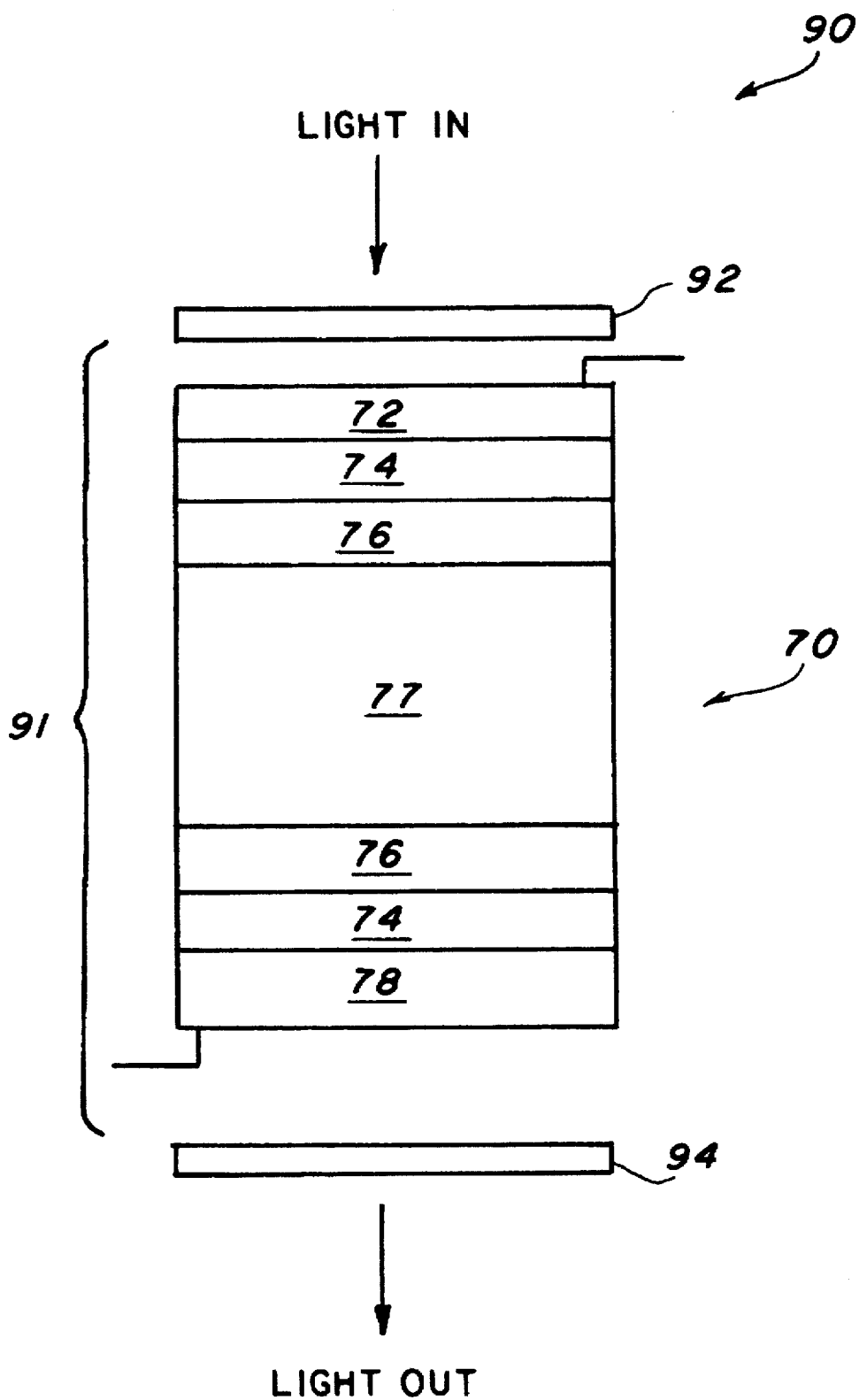
FIG. 9. shows a Fabry-Perot device, according to the invention.

One of the advantages of the present invention is that it is compatible with electrooptical coupling using normally incident light. This permits the use of the present invention in Fabry-Perot devices, as shown in FIG. 9. In a Fabry-Perot device 90, a cavity 91 is defined by opposing input 92 and output 94 mirrors. The input mirror 92 is partially reflecting/ partially transmitting at the wavelength of interest (i.e., the wavelength of the light modulated by the electro-optical modulator of the invention). The bottom mirror 94 is at least partially reflecting (and may optionally be totally reflecting) at the wavelength of interest. In the case where the bottom mirror is totally reflecting, the input (top) mirror is also used as the output mirror. In the case where the bottom mirror is partially reflecting, either the top or the bottom mirror (but usually the bottom mirror) may be used as the output mirror. One or both mirrors may comprise quarter wave stacks of semiconductor layers with differing refractive indices (Bragg mirrors), which may or may not be deposited as part of the same growth run with the active ADQW region of the EO modulator. When an EO modulator according to the present invention 70 is disposed in this cavity, parallel to the cavity-defining mirrors, the effective pathlength of normally incident light is multiplied, due to the repeated internal reflections of the incident light.

The present invention should have a wide acceptance angle about normal incidence. However, it is not required to use normally incident light with the present invention, since the resonance energies are in general different for the different valleys even if the angle of incidence is such that the Γ valley transitions are allowed.

In operation as an electro-optical intensity modulator, a means for applying a variable electric field is used to shift electrons between the asymmetric quantum wells of the invention. The fraction of electrons in each of the wells can be controlled by adjusting the applied electric field. To the extent that the electron population resides in optically-coupling (at normal incidence) L-state (or, alternatively, X-state) quantum wells, and the photon energy is near resonance with the intersubband energy spacings designed for the particular device, normally incident light will be absorbed by the device, and the transmission will be low. However, to the extent that the electron population resides in non-coupling (at normal incidence) Γ-state quantum wells, incident light will not be absorbed by the device, and the transmission will be high. At incident photon energies near resonance with the L-valley (or X-valley) intersubband separation, the normal-incidence absorption coefficient at a given field [$\alpha_z(F)$] will approximately follow the fraction of the electron population occupying L-valley (or X-valley) states (see FIG. 6, supra). The magnitude of the modulation ($\Delta\alpha_z$) can be quite high, since the L-valley absorption coefficients measured for GaSb-based quantum wells at normal incidence are typically on the order of $10^4$ $cm^{-1}$. An advantage of the invention is that shifting of the electrons between L and Γ states turns the transmitted intensity off and on (or, more generally, increases or decreases the transmitted intensity) rather than simply moving the absorption band to a different wavelength region.

Figures 10, 11:
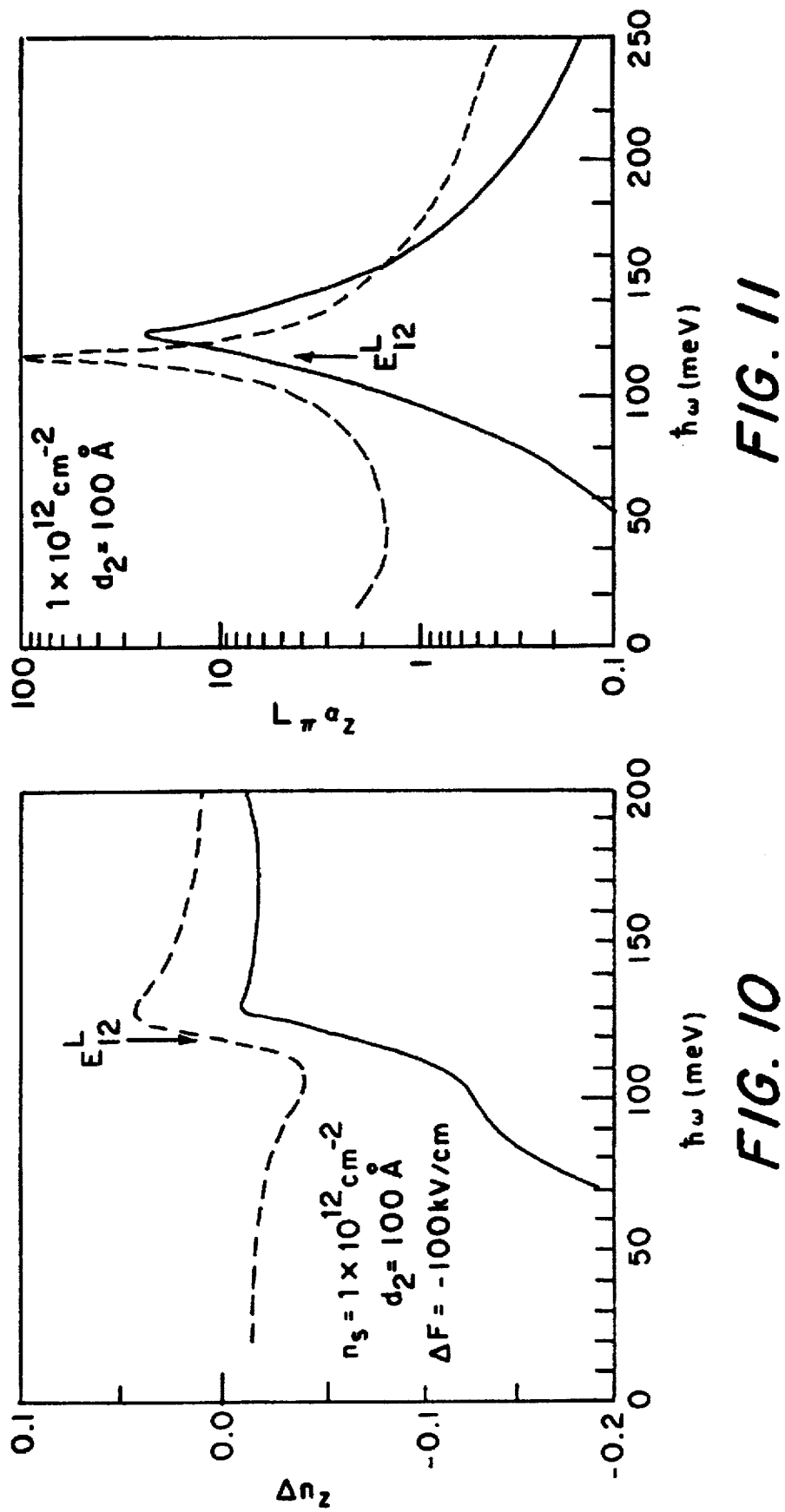
FIG. 10 shows the field-reversal shift of the refractive index vs. photon energy for an ADQW according to the invention.
FIG. 11 shows the propagation length required for a phase shift of $\pi$ (normalized by the absorption depth) vs. photon energy for an ADQW according to the invention.

The present invention may also be operated as a phase modulator. FIG. 10 shows the field-reversal shift of the refractive index vs. photon energy for the ADQW illustrated in FIG. 3. The dashed curve is the resonant term alone, while the solid curve also includes the plasma contribution. The Kramers-Kronig transformation specifies that any resonant modulation of the absorption coefficient must be accompanied by a corresponding resonant modulation of the refractive index. For the ADQW structure illustrated in FIG. 3, FIG. 10 plots the field-reversal (+40→−60 kV/cm) shift of the refractive index as a function of normally-incident photon energy, where an experimental broadening parameter of Γ≈10 meV has been assumed. The dashed curve represents the resonant (Kramers-Kronig) contribution by itself, which changes sign when the photon energy is equal to the intersubband transition energy and has its largest magnitude when $|\hbar\omega-E_{12}^L|\approx\Gamma$. However, a significant advantage of the Γ-L ADQW structure is that the interwell transfer also modulates the plasma contribution to the dielectric constant: $\epsilon_p \propto \Sigma_j N_j/m_{*j}\omega^2$, where $N_j$ is a given valley's electron population, $m_{*j}$ is its in-plane effective mass, and ω is the optical frequency. Previous single-valley EO designs resulted in $\Delta\epsilon_p\approx 0$, since the total density was fixed by the doping level and the field modulations of the wavefunctions and energy levels were not accompanied by any appreciable variation of the in-plane mass. However, the present devices will yield large $\Delta\epsilon_p$, because the relative valley populations are modulated by the field-induced transfer and the Γ-valley mass is much lighter than the L-valley mass. This is illustrated by the solid curve of FIG. 10, which represents the net index change due to the resonant and plasma contributions combined.

FIG. 11 shows the propagation length required for a phase shift of π (normalized by the absorption depth) vs. photon energy. The dashed curve again represents the resonant term alone while the solid curve includes $\Delta\epsilon_p$, which is the plasma contribution to the phase shift. The plasma mechanism is particularly attractive because it is not accompanied by any significant absorption as along as the device is operated far off resonance ($|\hbar\omega-E_{12}^L|>>\Gamma$) This non-resonance feature will be crucial in the design of practical phase modulators with minimal insertion losses. If we define $L_{90}$ to be the propagation length required to achieve a phase shift of π, the important figure of merit $L_{90}\alpha_z$ must be kept less than unity. Calculated values for this parameter as a function of photon energy are given in FIG. 11, where the Γ-L ADQW structure is the same as that in FIG. 10 and again the dashed curve corresponds to the resonant modulation alone. Note that whereas the performance is marginal for such a device, the addition of the plasma index shift (solid curve) leads to $L_\pi\alpha_z<<1$ at a wide range of both small and large photon energies.

Obviously, many modifications and variations of the present invention are possible in light of the above teachings. It is therefore to be understood that, within the scope of the appended claims, the invention may be practiced otherwise than as specifically described.

What is claimed is:

1. An electro-optical modulator, comprising:
   a first semiconductor barrier layer and a second semiconductor barrier layer;

a first quantum well layer having a conduction band minimum at the L point or the X point, disposed between said first and second semiconductor layers;

a second quantum well layer having a conduction band minimum at the $\Gamma$ point, disposed between said first and second semiconductor layers;

a spacer layer disposed between said first and second quantum well layers, wherein said spacer layer has a conduction band minimum for establishing quantum confinement in said first quantum well layer at said L or X point and in said second quantum well layer at said $\Gamma$ point, and is adapted for tunnelling between said first and second quantum well layers, and means for applying a controllable electric field in a direction normal to said first and second quantum well layers.

2. The electro-optical modulator of claim 1, wherein said first quantum well layer has a conduction band minimum at the L point.

3. The electro-optical modulator of claim 1, wherein said first quantum well layer has conduction band minimum at the X point.

4. The electro-optical modulator of claim 1, wherein said spacer layer has a thickness between about 20 Å and about 400 Å.

5. The electro-optical modulator of claim 1, wherein said spacer layer has a thickness between about 50 Å and about 150 Å.

6. The electro-optical modulator of claim 1, wherein said first quantum well layer has an energy gap between a first conduction subband minimum at the L point (L1) and a second conduction subband minimum at the L point (L2) about equal to the energy of a selected optical frequency.

7. The electro-optical modulator of claim 6, wherein said selected optical frequency is in the MWIR band.

8. The electro-optical modulator of claim 6, wherein said selected optical frequency is in the LWIR band.

9. The electro-optical modulator of claim 1, wherein said means for applying a controllable electric field is adapted for shifting a fraction of electrons between said first and second quantum well layers.

10. The electro-optical modulator of claim 9, wherein said means for applying a controllable electric field adapted for shifting a fraction of electrons is a means for applying a controllable electric field adapted for shifting a variable fraction of electrons.

11. The electro-optical modulator of claim 9, wherein said electro-optical modulator further comprises means for detecting an intensity of light transmitted through said device.

12. The electro-optical modulator of claim 9, wherein said electro-optical modulator further comprises means for detecting a phase shift of light transmitted through said device.

13. The electro-optical modulator of claim 9,
wherein said means for applying a controllable electric field in a direction normal to said first and second quantum well layers is adapted for changing the relative energies of said conduction band minimum in said first quantum well layer at said L or X point and said conduction band minimum in said second quantum well layer at said $\Gamma$ point, thereby changing the equilibrium position of electron populations in said quantum wells.

14. The electro-optical modulator of claim 13, wherein said means for applying a controllable electric field adapted for selecting which of said conduction band minimum in said first quantum well layer at said L or X point and said conduction band minimum in said second quantum well layer at said $\Gamma$ point has a lower energy, is further adapted for setting a first field level and a second field level;

wherein said first field level has one or both of a different sense and a different magnitude than said second field level;

wherein said conduction band minimum in said first quantum well layer at said L or X point has a lower energy than said conduction band minimum in said second quantum well layer at said $\Gamma$ point under said first field level; and wherein said conduction band minimum in said second quantum well layer at said $\Gamma$ point has a sufficiently lower energy than said conduction band minimum in said first quantum well layer at said L or X point under said second field level to shift a fraction of a population of electrons from said first quantum well layer to said second quantum well layer.

15. The electro-optical modulator of claim 13,
wherein said first quantum well layer, said spacer layer, and said second quantum well layer define a first period; and wherein said modulator further comprises a plurality of periods, connected in series, with each period separated from adjacent periods by a semiconductor barrier layer.

16. The electro-optical modulator of claim 9,
wherein said means for applying a controllable electric field in a direction normal to said first and second quantum well layers is adapted for selecting which of said conduction band minimum in said first quantum well layer at said L or X point and said conduction band minimum in said second quantum well layer at said $\Gamma$ point has a lower energy.

17. The electro-optical modulator of claim 1,
wherein said first quantum well layer having a conduction band minimum at the L point or the X point comprises a material selected from the group consisting of GaSb, GaAlSb, GaAsSb, AlAs grown along an axis other than <100> or equivalent, and AlGaAs grown along an axis other than <100> or equivalent; and wherein said second quantum well layer having a conduction band minimum at the $\Gamma$ point comprises a material selected from the group consisting of GaInSb, InAs, GaAsSb, GaAs, and AlGaAs.

18. An electro-optical modulator, comprising:

a first semiconductor barrier layer and a second semiconductor barrier layer;

a first quantum well layer having a conduction band minimum at a point in the Brillouin zone that is optically active at normal incidence for intersubband transitions, disposed between said first and second semiconductor layers;

a second quantum well layer having a conduction band minimum at a point in the Brillouin zone that is optically inactive at normal incidence for intersubband transitions, disposed between said first and second semiconductor layers;

a spacer layer disposed between said first and second quantum well layers, wherein said spacer layer has a conduction band minimum for establishing quantum confinement in said first quantum well layer at said L or X point and in said second quantum well layer at said $\Gamma$ point, and is adapted for tunnelling between said first and second quantum well layers, and means for applying a controllable electric field in a direction normal to said first and second quantum well layers.

19. The electro-optical modulator of claim 18, further comprising, parallel to and on opposing sides of said layers of said modulator, a first mirror and a second mirror, wherein said first mirror is partially reflecting at an optical wavelength.

20. The electro-optical modulator of claim 19, wherein said second mirror is partially reflecting at an optical wavelength.

21. The electro-optical modulator of claim 18, wherein said first quantum well layer has an energy gap between a first conduction subband minimum at the L point (L1) and a second conduction subband minimum at the L point (L2) about equal to the energy of a selected optical frequency.

22. The electro-optical modulator of claim 18, wherein said means for applying a controllable electric field is adapted for shifting a fraction of electrons between said first and second quantum well layers.

23. The electro-optical modulator of claim 18 wherein said electro-optical modulator further comprises means for detecting an intensity of light transmitted through said device.

24. The electro-optical modulator of claim 18, wherein said electro-optical modulator further comprises means for detecting a phase shift of light transmitted through said device.

25. A method for modulating light of a selected wavelength, comprising the steps:
(a) interposing an electro-optical modulator in the path of said light, wherein said modulator comprises
a first semiconductor barrier layer and a second semiconductor barrier layer;
a first quantum well layer having a conduction band minimum at the L point or the X point, disposed between said first and second semiconductor layers;
a second quantum well layer having a conduction band minimum at the $\Gamma$ point, disposed between said first and second semiconductor layers; and
a spacer layer disposed between said first and second quantum well layers, wherein said spacer layer has a conduction band minimum for establishing quantum confinement in said first quantum well layer at said L or X point and in said second quantum well layer at said $\Gamma$ point, and is adapted for tunnelling between said first and second quantum well layers; and
(b) applying a selected electric field in a direction normal to said first and second quantum well layers to thereby control modulation of said light.

* * * * *